United States Patent
Wong et al.

(10) Patent No.: US 6,453,177 B1
(45) Date of Patent: Sep. 17, 2002

(54) TRANSMITTING BEAM FORMING IN SMART ANTENNA ARRAY SYSTEM

(75) Inventors: Piu Bill Wong, Monte Sereno; Shimon B. Scherzer, Sunnyvale, both of CA (US)

(73) Assignee: Metawave Communications Corporation, Redmond, WA (US)

(*) Notice: Subject to any disclaimer, the term of this patent is extended or adjusted under 35 U.S.C. 154(b) by 0 days.

(21) Appl. No.: 09/511,665

(22) Filed: Feb. 23, 2000

Related U.S. Application Data

(60) Provisional application No. 60/143,895, filed on Jul. 14, 1999.

(51) Int. Cl.[7] .......................... H04B 1/38; H04B 17/00
(52) U.S. Cl. ................. 455/562; 455/67.6; 455/450; 455/67.3
(58) Field of Search .................. 455/562, 450, 455/453, 561, 513, 440, 67.1, 67.6, 67.3, 67.5; 375/148, 149, 150, 346, 349

(56) References Cited

U.S. PATENT DOCUMENTS

| | | | |
|---|---|---|---|
| 4,451,831 A | 5/1984 | Stangel et al. | 342/374 |
| 5,596,333 A * | 1/1997 | Bruckert | 455/562 |
| 5,615,409 A * | 3/1997 | Forssén et al. | 455/562 |
| 5,966,670 A * | 10/1999 | Keskitalo et al. | 455/562 |
| 6,108,565 A * | 8/2000 | Scherzer | 455/562 |
| 6,141,335 A * | 10/2000 | Kuwahara et al. | 455/513 |
| 6,144,340 A * | 11/2000 | Kiiski et al. | 342/371 |
| 6,151,513 A * | 11/2000 | Petry et al. | 455/562 |
| 6,229,481 B1 * | 5/2001 | Katz | 455/562 |

FOREIGN PATENT DOCUMENTS

| | | | |
|---|---|---|---|
| EP | 0 776 105 | 5/1997 | H04J/13/04 |
| EP | 0 853 393 | 7/1998 | H04B/7/26 |
| WO | 98/42150 | 9/1998 | H04Q/7/00 |
| WO | 99/14870 | 3/1999 | H04B/7/04 |
| WO | 99/25142 * | 5/1999 | H04Q/7/36 |

OTHER PUBLICATIONS

International Search Report mailed Oct. 8, 2001 in PCT/US01/00392.
Annex to Form PCT/ISA/206 Communication Relating to the Results of the Partial International Search (PCT/US01/00392) dated May 3, 2001.

* cited by examiner

*Primary Examiner*—William Trost
*Assistant Examiner*—Rafael Perez-Gutierrez
(74) *Attorney, Agent, or Firm*—Fulbright & Jaworski L.L.P.

(57) ABSTRACT

Traffic channel signals and pilot channel signals are transmitted from a base station to a mobile station using different beams. The beam carrying the pilot channel signal is a sector-wide beam, while the beam carrying the traffic channel signal has been minimized based on the number of frame errors associated with the traffic channel signal. The pilot and traffic channel signals are also phase matched. All traffic channel antenna beams in the same direction are maintained at approximately the same effective radiated power.

33 Claims, 4 Drawing Sheets

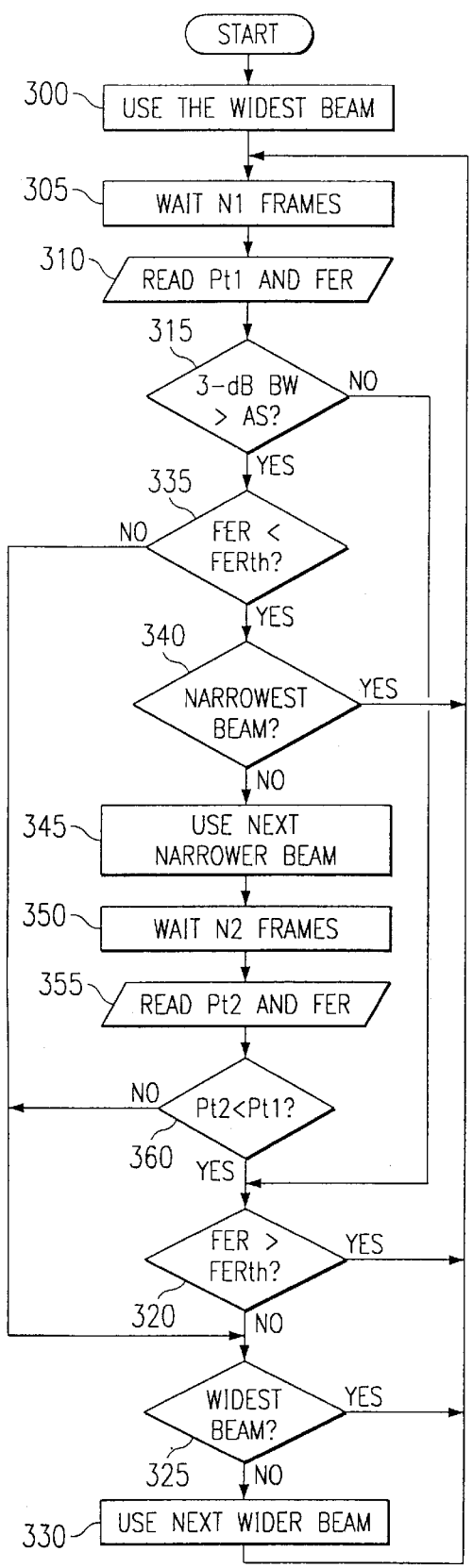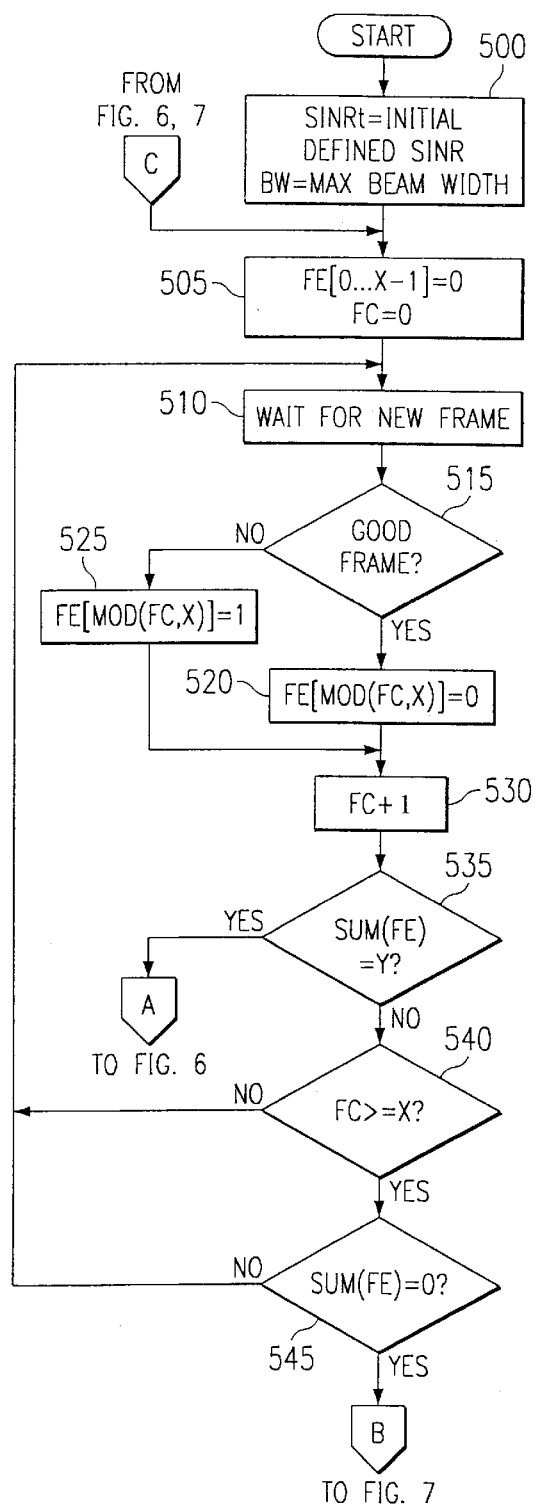
FIG. 3
FIG. 5

TRANSMITTING BEAM FORMING IN SMART ANTENNA ARRAY SYSTEM

CROSS-REFERENCE TO RELATED APPLICATIONS

This application is related to commonly-owned U.S. patent application Ser. No. 09/229,482, entitled "Practical Space-Time Radio Method for CDMA Communication Capacity Enhancement", filed on Jan. 13, 1999 and claims the benefit of U.S. Provisional Application No. 60/143,895, filed Jul. 14, 1999.

BACKGROUND

1. Field of the Invention

The present invention relates to wireless communication systems, and in particular, to wireless communications system base stations that use adaptive antenna arrays to transmit signals to wireless subscribers in order to enhance system performance.

2. Description of Related Art

In interference-limited wireless communication systems, the downlink (also known as forward link, from base station to mobile station or subscriber) system capacity is approximately inversely proportional to the average transmitting power per subscriber. Therefore to achieve the maximum downlink system capacity, it is generally required to transmit as little power as necessary to each individual wireless subscriber in the system. This task can be achieved by deploying downlink power control and/or smart antenna systems.

Power control algorithms allow base stations to transmit the minimum required power to the subscriber. In wireless systems, subscribers experience different co-channel interference mainly due to different inter-cell, inter-sector, and intra-sector interference (I_inter-cell, I_inter-sector, and I_intra-sector, respectively) levels. Subscribers also experience different received signal power levels due to different radio propagation environments. Hence, the downlink signal to interference-plus-noise ratio (SINR) at different subscribers are widely distributed. In order to achieve maximum downlink system capacity, all subscribers should have the same minimum required SINR. This may be achievable through a power control system.

Smart antenna algorithms allow base stations to effectively direct the transmitted power to the subscriber. Subscribers are generally randomly located in wireless communication systems. So most of the current base stations transmit radio signals into the whole sector which usually is a 120° sector (in 3-sector systems) or a 60° sector (in 6-sector systems). By doing so, the whole sector is being illuminated by the radio signals from the base station no matter where the subscriber is in the sector. This means the base station is also transmitting radio signal power into directions (areas) where the transmitted power can never reach the intended subscriber. In order to reduce these unnecessary illuminations, one can transmit radio signal power into directions (areas) that can improve the subscriber's received signal transmitted from the base station. This may be achievable through a smart antenna system.

Since the downlink capacity gain is proportional to the amount of the average transmit power level that is being reduced by power control and/or smart antenna systems, beam forming gain should not compromise power control gain and vice versa in order to achieve the maximum system capacity gain.

SUMMARY

In accordance with the invention, beam forming on downlink traffic channel signals is performed, whereby the direction, gain, and 3-dB beam width are adjusted based on various parameters, including frame error rates, pilot power measurements at the mobile station, angle spread estimation of the reverse link signals, distance estimation between mobile station and base station, etc. Phase-matching between the traffic channel and pilot channel signals is also performed. Phase-matching is accomplished by minimizing the average of the phase mismatch over the dominant downlink paths or by minimizing the mean-square error of the phase mismatched over the dominant paths.

Beam forming on the downlink traffic channel signals involves determining the main lobe beam direction and selecting the beam width. The direction of the downlink main lobe beam is based on an average uplink channel estimator or angle of arrival data to select the most likely direction of the desired mobile station. Once the direction is determined, the 3-dB beam width (or equivalently, the gain) is selected based on frame error rates, pilot power measurements at the mobile station, angle spread estimation of the reverse link signals, distance estimation between mobile station and base station, etc.

According to one embodiment, the narrowest width beam (or highest gain beam) is selected that has 1) a frame error rate (FER) less than a pre-defined FER threshold and 2) a traffic beam transmitting power after a beam width change less than the transmitting power prior to the beam width change. According to another embodiment, the beam width is adjusted according to the target downlink frame error rate (or target SNR), the downlink pilot signal strength, and the reverse link angle of arrival. The beam width is reduced, by increments of one step (to the next narrower beam), which is equivalent to increasing the gain (e.g., by 0.5 dB), if the mobile station is in a region where the FER reported by the mobile station is decreasing, i.e., a narrower beam can be used while still maintaining a desired FER. The beam width is increased, by increments of one step (to the next wider beam), if the FER is increasing to near the FER threshold and the pilot signal strength is increasing or unchanged. The beam width is unchanged if 1) the pilot power strength is increasing and the FER is unchanged or 2) the FER is increasing, but not to near the FER threshold. However, if there is not frame error and pilot strength reporting or if the mobile station is in a deep fading region for more than X measurement frames, i.e., the cycle of a periodic report by the mobile station, the beam width is selected to just exceed the angle spread, as estimated by AOA data or other suitable methods.

Yet another embodiment for down link beamforming selects the downlink or forward link beam width and target signal to interference-plus-noise ratio (SINRt) based on downlink pilot channel strength and downlink traffic frame errors. If a threshold number of frame errors is met, then 1) increase the beam width by a fixed number of steps if a) the beam width was decreased last time, or b) the beam width was increased last time, but not to the maximum allowable beam width and the SINRt is at the maximum value, or c) the beam width was neither changed last time nor at the maximum and the SINRt was increased last time, 2) increase SINRt by a fixed number of steps if a) the SINRt was decreased last time, or b) the SINRt was increased last time, but not to the maximum allowable SINRt value and the beam width is at the maximum value, or c) the SINRt was neither changed last time nor at the maximum value and the beam width was increased last time, and 3) leave the beam width and the SINRt unchanged if both the beam width and the SINRt are at their respective maximum allowable values.

However, if the threshold number of frame errors is not met in the last X (a predefined fixed number) measurement frames, then 1) decrease the beam width by a fixed number of steps if a) the beam width was changed last time, but not to the minimum beam size and SINRt is at the minimum allowable value or b) the beam width was neither changed last time nor at the minimum, 2) decrease SINRt by a fixed number of steps if a) the beam width was changed last time and SINRt is not at the minimum or b) the beam width was not changed last time, but is at the minimum and SINRt is not at the minimum, and 3) leave SINRt and the beam width unchanged if both SINRt and the beam width are at their respective minimum allowable values.

Regardless of the method used for downlink beam forming, a constant Effective Radiation Power (ERP) is maintained for all traffic beams in the main lobe direction for a fixed power control value. Constant ERP is maintained by changing beam forming coefficients to compensate for the different antenna gains.

The present invention will be more fully understood upon consideration of the detailed description below, taken together with the accompanying drawings.

BRIEF DESCRIPTION OF THE DRAWINGS

FIG. 3 is a flowchart illustrating one antenna beam width selection algorithm for a given transmitting direction based on downlink frame errors and transmitting power according to one embodiment of the present invention;

FIGS. 5, 6, and 7 are flowcharts illustrating a method to control jointly the forward link target SINR and forward link transmitting beam width.

Use of the same reference symbols in different figures indicates similar or identical items.

DETAILED DESCRIPTION OF THE PREFERRED EMBODIMENTS

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

Figure 1:
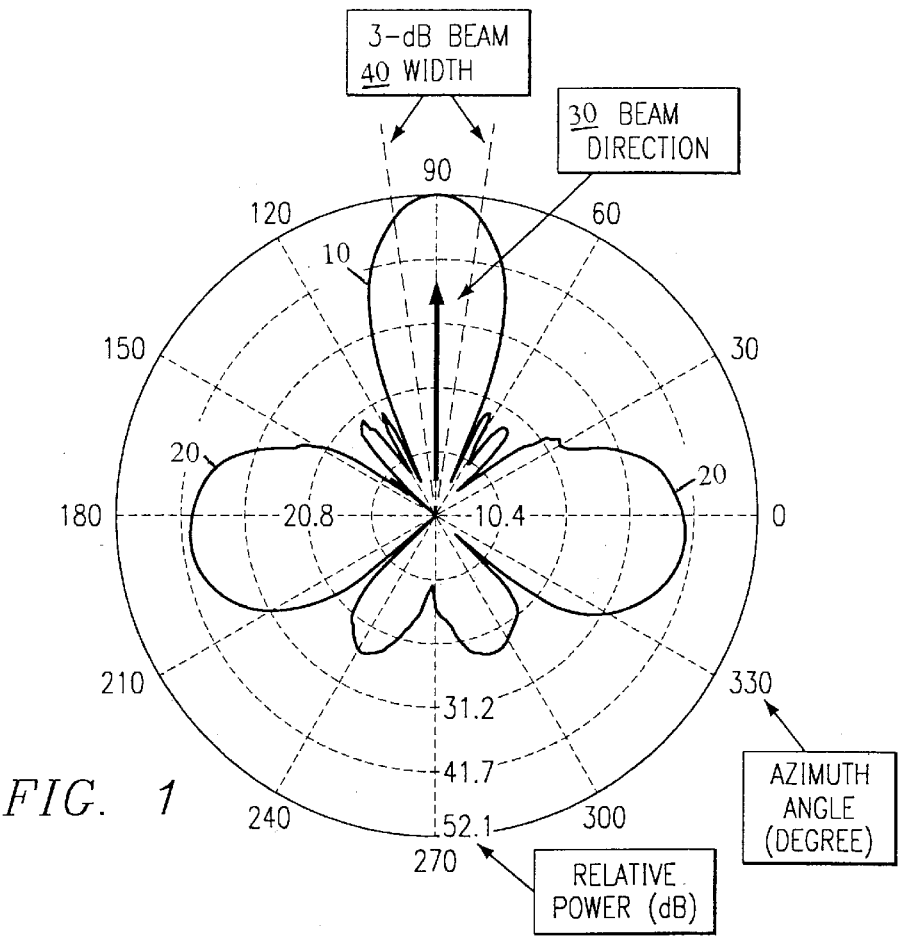
FIG. 1 is an antenna pattern of a typical downlink beam.
Figure 2:
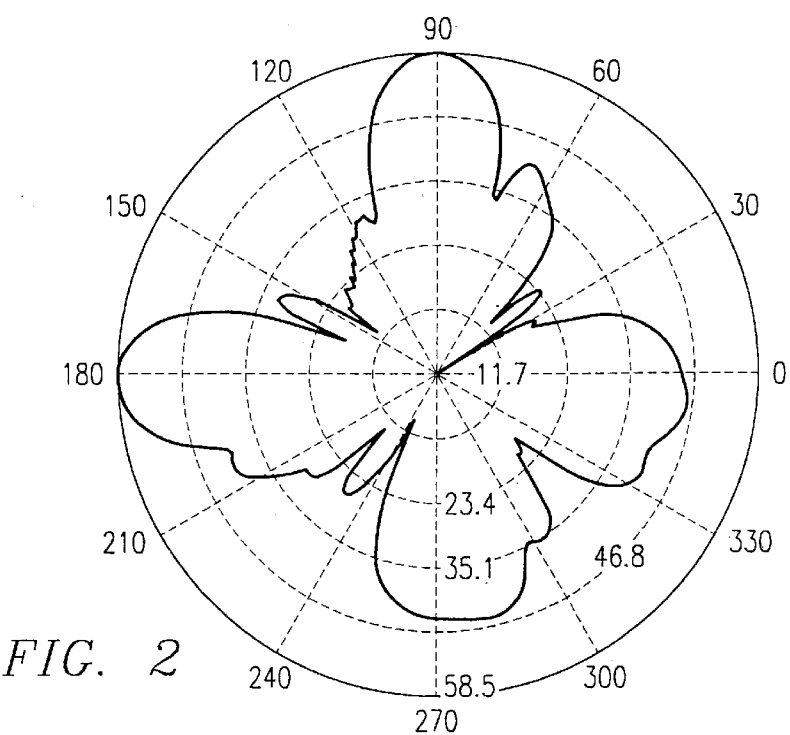
FIG. 2 is an antenna pattern of super-positioning two antenna beams.

For the simplicity of description-of this invention, we are assuming that the downlink beam patterns are similar to the type shown in FIG. 1. This type of-beam pattern has one main lobe 10 and many less significant side lobes 20 (usually more than 10 dB down in relative power density from main lobe 10). Sometimes the main lobe may contain ripples (power density variations) of less than 3 dB (i.e., the maximum to the minimum power density ratio in the main lobe is less than 3 dB). This type of beam pattern may be characterized by two parameters: 1) the beam direction 30 of the main lobe, and 2) the 3-dB beam width 40 of the main lobe as shown in FIG. 1. Any traffic beams described in this invention use this type of beam pattern or any super-position (combination) of these patterns. An example of a super-position beam pattern is shown in FIG. 2, where the pattern is generated by super-positioning two beams like the one shown in FIG. 1 with beam directions of 90° and 180°.

In wireless systems like the U.S. code division multiple access (CDMA) systems (IS-95), subscribers are required to constantly use common channels (e.g., pilot and synchronization channels in IS-95) to help demodulate the received traffic signals. These common channels are being transmitted constantly and into the whole sector (whole service areas). Subscribers use the received pilot channel to coherently demodulate the received traffic signals. Therefore the phases between the received pilot channel signals and the received traffic channel signals at the subscriber have to be closely matched (e.g., within 25° for less than 1 dB signal to noise ratio degradation for binary phase-shift keying modulation as used in IS-95 downlink). Today, this phase matching requirement is achieved by transmitting both the pilot channels and the traffic channels in the same antenna beam. That is, traffic channels are also being transmitted into the whole sector (whole service areas) just like the pilot channels using the sector beams.

This invention proposes to do beam forming on the traffic channels so long as the pilot phase matching requirement can be achieved. To successfully meet this requirement, the traffic beam should cover all the dominant radio propagation paths (or the scatterers that are also illuminated by the pilot beam) that contribute to the signals received at the subscriber. A phase correction factor ($e^{j\alpha}$) is introduced into the traffic beam weights ($\vec{W}$) so that the average phase difference between the traffic beam and the pilot beam in the dominant path directions is minimized, where dominant path directions can be defined using methods disclosed in U.S. patent application Ser. No. 09/229,482, which is incorporated by reference in its entirety. Traffic beam weights, which are different gains and phases used to generate the desired antenna patterns, can be determined using least mean square algorithms, given the transmitting antenna array and the desired transmitting antenna beam pattern. This process can also be described by the following equation:

$$\vec{W}_{phase\ matched} = \vec{W} \cdot e^{j\alpha} \qquad (1)$$

where $\alpha = \text{phase}_{pilot} - \text{phase}_{traffic(before\_phase\_matching)}$, over the dominant path directions.

Minimizing the average of the phase mismatched over the dominant paths is one of the many methods to ensure proper phase matching. One other method is to minimize the mean square error of the phase mismatched over the dominant paths, or equivalently, to minimize the following over the dominant path directions:

$$\Sigma(\text{phase}_{pilot} - \text{phase}_{traffic(after\_phase\_matching)})^2 \qquad (2)$$

Pilot phase matching can be carried out by illuminating only the dominant paths instead of all the scatterers that reflect transmitted signals to the subscriber. There are other benefits beside pilot phase matching by illuminating all the scatterers that reflect transmitted signals to the subscriber. For CDMA systems (including both narrow band systems like IS-95 or wide band systems like IMT-2000), the additional benefits can come from providing more independent multi-paths in a Rake receiver for time diversity. For time division multiple access (TDMA) systems (including both IS-136 and GSM), the advantages can come from providing more independent multi-paths in equalizer-receiver for time diversity.

Methods of adjusting the downlink traffic beam for optimal downlink performance are described below in the following sections: I. Constant Effective Radiation Power, II. Main Lobe Beam Direction Determination, III. Beam Width Selection Algorithm Based on Frame Errors and Transmitting Power, IV. Beam Width Selection Algorithm Based on Frame Errors and Downlink Common Channel Signal Strength Measurements, V. Beam Width Selection Algorithm Based on AOA Histogram, VI. Beam Width Selection and Power Control Algorithm Based on Downlink Common Channel Signal Strength Measurements and Frame Errors, and VII. Uneven Step Sizes and Holding Interval For Beam Width Selection.

I. Constant Effective Radiation Power (CERP)

As the radio propagation environments change due to movement of subscribers and/or surroundings, the traffic beam for a subscriber will also need to be changed (updated) to provide the optimum downlink beam. Changing the traffic beam includes changing the 3-dB beam width of the traffic beam and hence the antenna gain of the traffic beam. The effective radiation power (ERP) density in the main lobe direction is therefore changing as well, if the beam forming weights $\vec{W}$ are not adjusted to compensate for the antenna gain. The main lobe ERP can vary by more than 7 dB for a 16-element circular antenna array.

In most wireless systems, forward link power control algorithms are being implemented to adjust the base station downlink transmitting power level to the adequate minimum in order to enhance downlink system capacity. Power control algorithms are designed to compensate for the variance of SINR received by the subscriber. The changes in the effective radiation power of the main lobe during a downlink beam forming process can reduce the effectiveness of the downlink power control algorithm in improving downlink system capacity. Thus, in order to achieve the maximum system capacity gain, beam forming gain should not compromise power control gain and vice versa.

One way to reduce the impact on a power control algorithm due to ERP variation is to maintain a constant ERP for all interested (i.e., downlink transmitting) directions and 3-dB beam widths for a fixed power control value. One simple way to achieve constant ERP is by changing the beam forming coefficients to compensate for the different antenna gains. Assuming we point the beam to the right direction with the right beam width, traffic beam forming process would be transparent to power control algorithms if all the traffic beams have the same ERP in the main lobe direction and there are not multi-paths.

II. Main Lobe Beam Direction Determination

One parameter for determining the traffic beam pattern is the main lobe beam direction. This main lobe beam direction can be determined from the angle of arrival (AOA) histogram on the uplink (reverse link or subscriber to base station) signals, as described in commonly-owned U.S. patent application Ser. No. 09/229,482, incorporated by reference above, and U.S. patent application Ser. No. 09/310,567, entitled "Manifold Assisted Channel Estimation For CDMA Systems In Fast Fading Environments", filed on May 12, 1999, which is incorporated by reference in its entirety. Another type of AOA histogram can be the accumulation of the AOA magnitude output from the uplink channel estimator (also described in U.S. pat application Ser. No. 09/229,482). The desired downlink traffic beam main lobe direction ($\theta_{desired}$) can then be chosen to minimize the following equation:

$$\Omega = \sum_{\forall \theta} \min(|\theta - \theta_{desired}|, 360° - |\theta - \theta_{desired}|)^n \cdot \overline{Mag(\theta)}^m \quad (3)$$

where $\theta$ is the azimuth angle in degrees; $\overline{Mag(\theta)}$ is the average uplink channel estimator output at angle $\theta$, as described in commonly-owned U.S. patent application Ser. No. 09/229,482; min(x,y) is the "minimum" function which chooses the lesser value of the two quantities x and y; $\sum_{\forall \theta}$ is the summation of all the azimuth angles in the AOA histogram; and n and m are integers, which are typically 1 and 2, respectively, and based on system requirements. $\theta_{desired}$ can be found by the following equation for n=1 and m=2:

$$\theta_{desired} = \sum_{\forall \theta} e^{-j\frac{\theta}{180} \cdot \pi} \cdot \overline{Mag(\theta)}^2 \quad (4)$$

If m is large, for example, larger than 10, $\theta_{desired}$ can be approximated by $\theta_d$, where $\theta_d$ is such that $\overline{Mag(\theta_d)}$ is maximum for all $\theta$.

III. Beam Width Selection Algorithm Based on Frame Errors and Transmitting Power The sizes of 3-dB beam widths of the concurrent downlink traffic beams are approximately inversely proportional to the concurrent downlink system capacity. It is therefore desirable to select the minimum allowable size of the 3-dB beam width (maximum antenna array gain) for each individual wireless subscriber (mobile station) without compromising the performance of downlink power control and pilot/traffic phase coherency.

FIG. 3 is a flowchart of an antenna beam width selection algorithm for a given transmitting direction based on downlink frame errors and downlink total transmitting power. Downlink frame error information can be obtained from the subscriber unit through its periodic reporting schemes as in IS-95. The total transmitting power setting at the base station is known since the forward link power control value and the beam forming coefficients are known at the base station. In step 300, the widest beam width is selected for the downlink antenna beam, where the widest beam is the sector wide beam which is used by the pilot, synchronization, and paging channels. The system then waits N1 frames, in step 305, where N1 should be as small as possible, but large enough so that the total transmitting power to the mobile station (Pt1) and forward link frame error rate (FER) readings are settled. Optimal values of N1 can be determined through computer simulations and field testings. A frame has a 20 ms interval in IS-95.

In step 310, Pt1 and forward link FER are then read, where the FER is the ratio of the number of frames received by the mobile station in error to the total number of frames transmitted from the base station. In step 315, the 3-dB beamwidth of the current beam is compared with the angle spread (AS) threshold, a rough estimate of which can be determined from the AOA histogram as described in U.S. patent application Ser. No. 09/229,482. The proper threshold setting can be determined through computer simulations and field testing. If the 3-dB beam width is less than or equal to the angle spread threshold, then the frame error rate is compared to a frame error rate threshold (FERth), in step 320, which is set to a value (e.g., by computer simulations or field testing) so that the overall voice communication quality is at an acceptable standard for the system. If the frame error rate is less than FERth, in step 320, the current beam is used and the system returns to step 305. However, if the frame error rate is greater than or equal to FERth, then a determination is made in step 325 if the current beam is the widest beam. If the current beam is the widest beam, then the current beam is used and the system returns to step 305 and waits N1 frames. If the current beam is not the widest beam, then the next wider beam is selected in step 330.

In step 315, if the 3-dB beam width is greater than the angle spread threshold, then the frame error rate is compared to the frame error rate threshold in step 335. If the frame error rate is greater than or equal to FERth, then the current beam is selected if it is the widest beam; otherwise, the next wider beam is selected. However, if the frame error rate is less than FERth, then the current beam is checked, in step 340, to determine if it is the narrowest beam, i.e., the highest antenna gain that the antenna array can form. If the current beam is the narrowest beam, then the current beam is selected and the system returns to step 305 and waits N1 frames. If the current beam is not the narrowest beam, the next narrower beam is selected in step 345. The increment between antenna gains of adjacent beamwidths can be 0.5 to 1 dB, where the set of beamwidths ranges from the narrowest beamwidth (the maximum antenna gain) to the widest beamwidth (the sector wide beam with the minimum antenna gain).

In step 350, the system then waits N2 frames, which is generally a number less than N1. The total transmitting power after a beamwidth change (Pt2) and frame error rate is read in step 355, and the transmitting power Pt2 is compared in step 360 with the transmitting power Pt1. If Pt2 is less than Pt1, then the system goes to step 320 to compare the frame error rate to FERth. If the frame error rate is less than FERth, the system uses the current beam and goes to step 305. If Pt2 is greater than or equal to Pt1, and the current beam is not the widest beam, the next wider beam is selected in step 330; otherwise, the current beam is selected.

The constant effective radiation power (CERP) algorithm, described above in section I, is implemented for all the traffic beams. The antenna gain variation between adjacent 3-dB beam width traffic beams is generally quite small, about 0.5 dB for example. This algorithm is designed to maximize the sum of the power control gain and the smart antenna beam forming gain and continues to run and change the beam width until the call is dropped. Another type of beam width selection algorithm is described below, which uses frame errors and downlink common channel signal strength measurements.

IV. Beam Width Selection Algorithm Based on Frame Errors and Downlink Common Channel Signal Strength Measurements There are 2 types of subscriber received power measurement reports (PMR) in IS-95: a periodical report and a threshold report. The subscriber unit reports the downlink frame errors and the dominated pilot channel signal strengths. In some systems, the cycle of the periodical report is X frames, for example, 50, and the number of error frames for the threshold report is Y error frames, for example, 2. X and Y are typically set to maintain the forward link FER at less than 4%. Therefore, the subscriber unit sends a PMR every X frames (e.g., every 1 sec) if it detects less than Y errors in X measurement frames, where the frame period is 20 ms in IS-95. This is the maximum period of a PMR. On the other hand, the subscriber unit sends a PMR every 40 ms (actually this depends on subscriber unit as some subscriber units may not be able to support such a high reporting rate) if it consequently detects errors in the measurement frames. This is the minimum period of a PMR.

An alternative beam width selection algorithm utilizes the target downlink frame error rate (FER) or target signal to noise ratio (Ec/Io), the subscriber unit received pilot strength parameters, and the reverse link angle of arrival (AOA) histogram to update the beam width (antenna array gain) of an active traffic antenna array beam. Both the target downlink frame error rate and the target signal to noise ratio are functions of downlink frame error rates, such that if the downlink frame error rate is higher than a predefined threshold for good voice quality, the target signal to noise ratio or the target downlink frame error rate will be set higher than the current value. For example, if there are Y consecutive errors, the target SINR can be increased by one step (for example, 0.5 dB). If the subscriber unit detects Y or more errors in X measurement frames, the target SINR can also be increased by one step. If the subscriber unit detects more than 0 and less than Y errors in X measurement frames, the target SINR can remain unchanged. If the subscriber unit detects zero error in X measurement frames, the target SINR can be decreased by one step, e.g., 0.5 dB.

The antenna array gain has a step size of about 0.5 dB, an upper limit of 12-dB azimuth gain, if a 16-element antenna array is used to cover the whole 360° azimuth angles, and a lower limit of 5-dB azimuth gain for a 120° sector beam. That is, each direction has 15 different antenna array beam widths.

Figure 4:
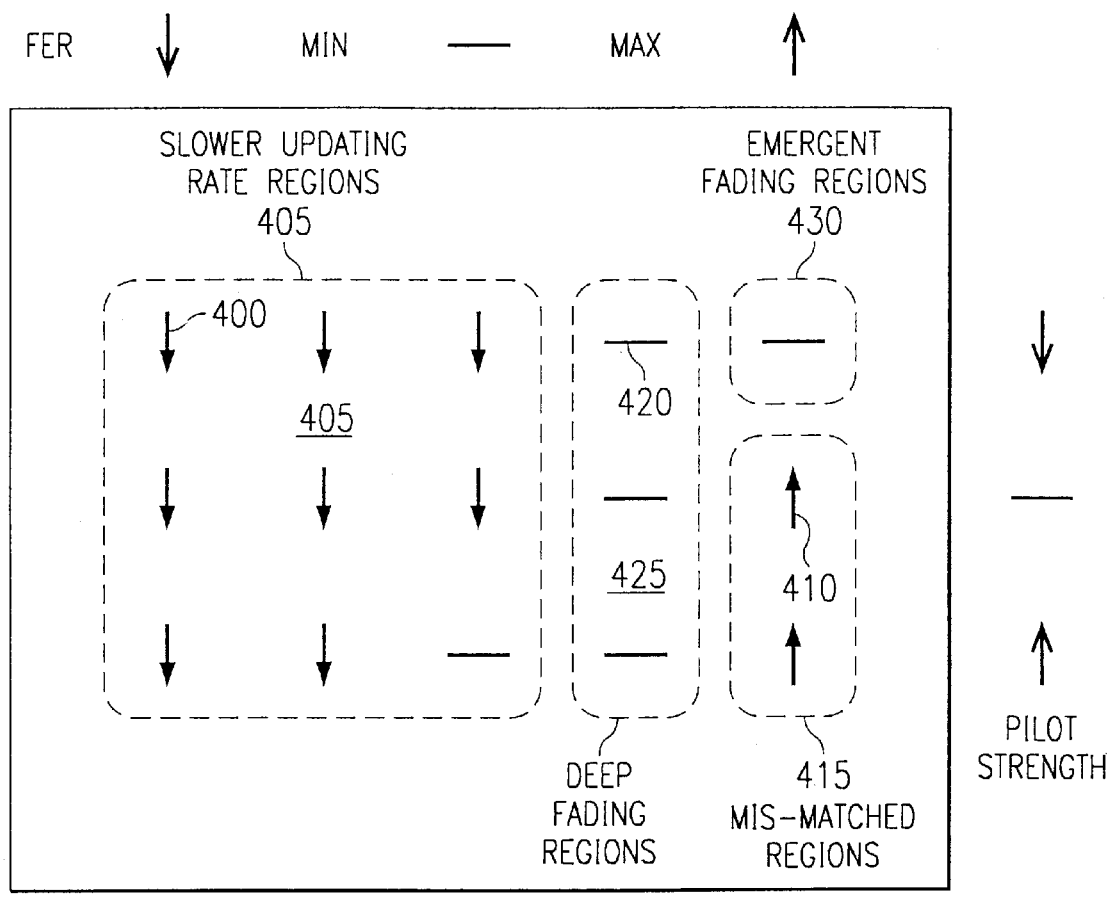
FIG. 4 is a diagram showing a beam width selection algorithm according to another embodiment of the present invention.
Figure 4:
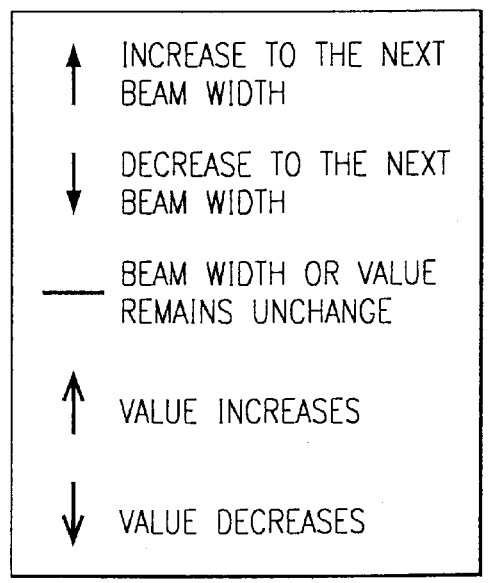

FIG. 4 shows a beam width selection algorithm that can be implemented in the software. Constant effective radiation power (CERP) algorithm is implemented for all the traffic beams. Down-pointed arrows 400 imply reducing the beam width by one step (or equivalently, increasing the antenna array gain by 0.5 dB) if there is a narrower beam available, i.e., the selection algorithm has not reached the narrowest beamwidth yet. Generally, the beam width is decreased if the mobile station is in a slower updating rate region 405, e.g., in regions where the FER reported from the mobile station is good (or less than certain pre-defined threshold, e.g., 2%). However, if the mobile station is in region 405, but in a region where the pilot power strength, reported by the mobile station to the base station, is increasing while the FER is remaining unchanged, then the beam width remains unchanged as well. Up-pointed arrows 410 imply increasing the beam width by one step (or equivalently, reducing the antenna array gain by 0.5 dB) if there is a wider beam available. As shown in FIG. 4, the beam width is increased in mis-matched regions 415, i.e., regions where the FER is increasing to near maximum and pilot strength is increasing or unchanged. Horizontal bars 420 imply no change in the traffic beam width, as when the mobile station is in deep fading regions 425 or emergent fading regions 430, shown in FIG. 4.

In the beginning of the traffic beam setup, the widest beam can be selected if a good (i.e., stabilized) AOA histogram has not been established. If a good AOA histogram has been established, the antenna beam width can be selected to just exceed the angle spread (AS) parameter, as defined above with respect to FIG. 3. AS is a parameter that can be calculated from an AOA histogram, as shown below, and can conservatively reflect the actual angle spread observed by the base station. One metric for the AS parameter can be finding a peak in the AOA histogram and then dividing the peak by the average of the AOA histogram. Another metric can be to use equation (3), as described above, after the beam direction ($\theta_{desired}$) is determined. Equation (3) is reprinted below.

$$\Omega = \sum_{\forall \theta} \min(|\theta - \theta_{desired}|, 360^\circ - |\theta - \theta_{desired}|)^n \cdot \overline{Mag(\theta)}^m \quad (3)$$

One other metric is given by equation 5, as follows:

$$\Omega = \sum_{\forall \theta} abs\left(angle\left(\frac{e^{-j \cdot \pi \cdot \frac{\theta}{180}}}{e^{-j \cdot \pi \cdot \frac{\theta_{desired}}{180}}}\right)\right) \cdot \overline{Mag(\theta)}^m \quad (5)$$

where abs( ) is the absolute function and angle is an arctangent function which gives result in radians from $-\pi$ to $\pi$. $\Omega$ is the estimated parameter of AS, the actual angular spread.

If there is no frame error and pilot strength reporting, or the mobile station is in deep fading regions 425 (as shown in FIG. 4) for more than X frames, the beam width selection algorithm selects the beam width to just exceed the AS estimated parameter if $\Omega$ is available, i.e., selecting the narrowest beam width that covers the angle spread. If the AS estimated parameter $\Omega$ is not available due to a bad AOA histogram, the sector-wide beam is selected.

It should be noted that the beam direction updating rate and beam width updating rate can be different. The beam direction updating procedure can be controlled by the reverse AOA histogram data alone. If the AOA histogram data is bad, i.e., the direction and AS parameter of the subscriber unit are unknown, the widest beam can be selected. This algorithm shown in FIG. 4 is running all the time to ensure the base station is using the antenna beam with the highest possible antenna gain without sacrificing power control gain and forward link frame error rate.

V. Beam Width Selection Algorithm Based on AOA Histogram

An alternative to the above-described methods for forming downlink traffic beams is simply weighting each column vector of the array response matrix with its $\overline{(Mag(\theta))}^m$, where m is an integer from 1 to 6 (typically 1 or 2), and then sum all the column vectors to generate the traffic beam weight. The array response matrix is simply a matrix of the array response column vectors at all the azimuth angles uniformly spaced in 360°. These array response vectors are measured under no multiple path and insignificant noise environments. U.S. patent application Ser. No. 09/229,482 provides a more detailed description of the array response vector. The computed weight is then adjusted such that the ERP at the main lobe direction is the same as the sector-wide beam for a fixed power control value before using for forming the traffic beam. If downlink signal transmission experiences high frame errors when using the synthesized beam formed by the computed weight, the sector-wide beam (0 gain) is used instead.

VI. Beam Width Selection and Power Control Algorithm Based on Downlink Common Channel Signal Strength Measurements and Forward Link Frame Errors U.S. Pat. No. 5,771,451, entitled "Method of Transmission Power Control in a Cellular Mobile Communication System and Apparatus Thereof" to Takai et al., which is incorporated by reference in its entirety, provides an efficient forward link power control method based on pilot signal power measurement at the mobile station and the forward link frame error rate. Pilot signal is the downlink common channel signal used for coherent demodulation in IS-95. Pilot power measured value(s) is(are) used to inversely scale the forward link transmitted power. The forward link frame error rate is used to set the target SINR with step size of, e.g., 0.5 dB, at the mobile unit and hence adjust the transmitting power with the same step size.

Figure 6:
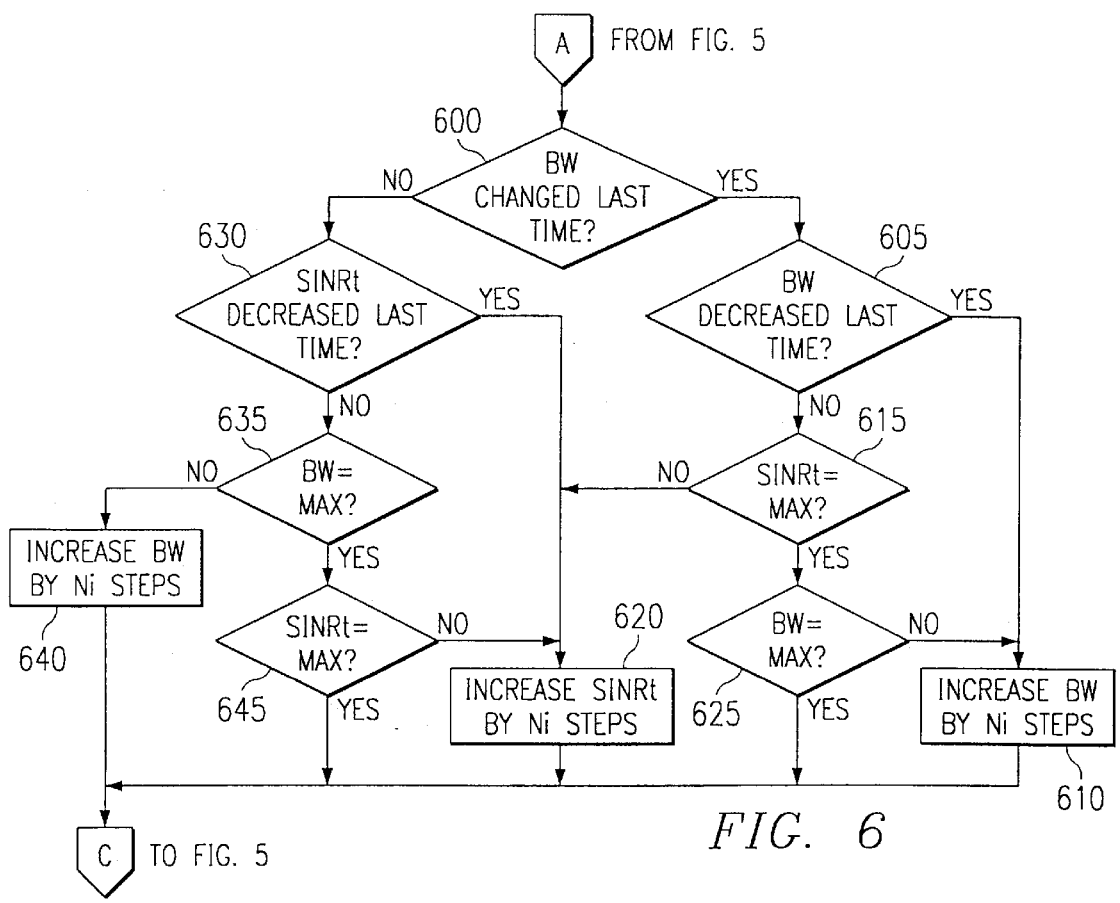
Figure 7:
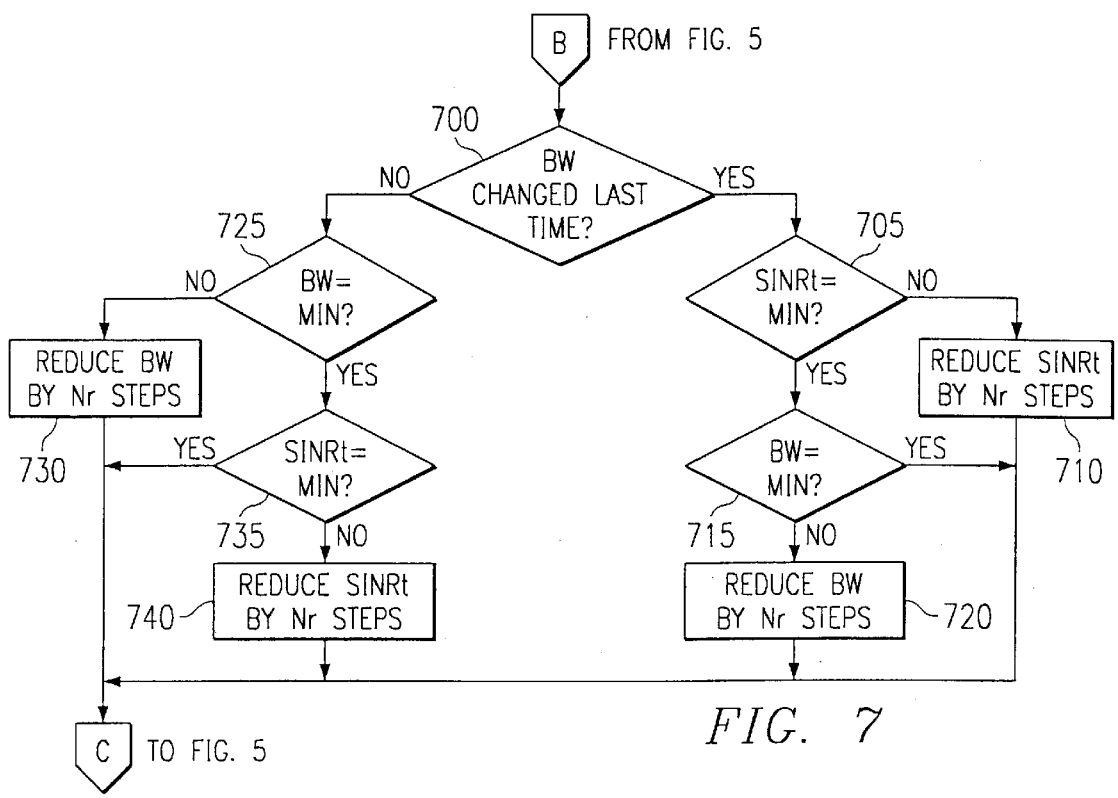

In this embodiment, pilot power measured values can be used in the same way as described in U.S. Pat. No. 5,771,451 to inversely scale the forward link transmitting power. Mobile target SINR and forward link beam width, on the other hand, are jointly determined by forward link frame errors. Forward link frame errors are being reported from mobile station to the base station during call connection. FIGS. 5–7 describe the method to control jointly the forward link target SINR (SINRt in the figures) and forward link transmitting beam width (BW in the figures). SINRt and BW values have direct impact on the forward link transmitting power.

In FIG. 5, in step 500, the forward link target SINR is set to an initial defined signal to interference-plus-noise ratio, as determined by the system, and the forward link transmitting beam width is set to the maximum beam width allowed by the system. In step 505, the variable FE, which is an X-dimensional vector used to store frame error indicator bits up to X bits, and the variable FC, which is a scalar to count the number of valid frame error indicator bits stored in FE, are both initialized to zero. X is the total number of measurement frames, with a typical number being 50. In step 510, the system waits for a new frame. If the new frame is a good frame, as determined in step 515, FE[mod(FC, X)] is set to zero in step 520, where mod( ) is the regular modulus function. However, if the new frame is not a good frame (i.e., a "bad" frame), then FE[mod(FC, X)] is set to one in step 525. FC is then incremented by one in step 530. A good frame is indicated by downlink (forward link) frame error information, which can be obtained from the frame erasure indicator bit in every reverse link frame as in IS-95 , Rate Set 2. In step 535, the sum of the elements of vector FE are compared to a quantity Y, which is the threshold number of frame errors. A typical value of Y is 2. If sum(FE) is equal to Y, indicating a "bad" condition, bad condition processing is initiated to increase the beam width or SINRt, shown in FIG. 6.

In step 600, if the forward link transmitting beam width was changed last time, a determination is made in step 605 as to whether the beam width was decreased last time. If the beam width was decreased last time, the beam width is increased by Ni steps in step 610, where Ni is a predefined integer value and is typically 1. Each beam width step can be about 0.5 dB (after converting beam width to antenna gain). FE and FC are then re-initialized in step 505. Each SINR step can be about 0.5 dB. However, if the beam width was not decreased last time, SINRt is compared with the maximum allowable SINR in step 615. The maximum allowable SINR can be as high as 0 dB. If SINRt is not at the maximum, SINRt is increased by Ni steps in step 620, and FE and FC are re-initialized in step 505. However, if SINRt is at the maximum, the beam width is checked to see if it is at the maximum allowable beam width in step 625. The maximum allowable beam width can be a function of the AOA histogram and the time finger(s) (time of signal arrival) of the reverse link signals. AOA histogram provides information regarding the angle spread. In general, the wider the angle spread, the larger the maximum allowable beam width.

Time finger(s) give an estimate of the distance between the mobile station and the base station. In general, the longer the distance, the smaller the maximum allowable beam width. The optimum maximum allowable beam width can be chosen through experimental field tests. For example, in a suburban environment like Campbell, Calif., for distances between 1 km to 2 km from the mobile station to the base station, the maximum allowable beam width is chosen to be 50 degrees. For distances between 30 m to 300 m, the maximum allowable beam width is chosen to be 80 degrees. For the same distances in an urban environment, the maximum allowable beam width would be larger. If the beam width is also at the maximum, FE and FC are re-initialized in step 505. However, if the beam width is not at the maximum, the beam width is increased by Ni steps in step 610, and FE and FC are re-initialized in step 505.

If the beam width had not been changed last time, but SINRt had been decreased last time, as determined in step 630, SINRt is increased by Ni steps in step 620, and FE and FC are re-initialized in step 505. However, if SINRt was not decreased last time, and the beam width is not at the maximum allowable beam width, as determined in step 635, the beam width is increased by Ni steps in step 640, and FE and FC are re-initialized in step 505. If the beam width is already at the maximum, and SINRt is also at the maximum, as determined in step 645, FE and FC are re-initialized in step 505. But, if SINRt is not at the maximum, SINRt is increased by Ni steps in step 620, and FE and FC are re-initialized in step 505.

Referring back to FIG. 5, if sum(FE) is not equal to Y in step 535, FC is compared to the quantity X in step 540. If FC is less than X, the system waits for a new frame in step 510. However, if FC is greater than or equal to X, and sum(FE) is not equal to zero, as determined in step 545, the system waits for a new frame in step 510. If FC is greater than or equal to X and sum(FE) is equal to zero, indicating a "good" condition, good condition processing is initiated to decrease beam width or SINRt, as shown in FIG. 7.

In step 700, if the forward link transmitting beam width was changed last time, a determination is made in step 705 as to whether SINRt is at the minimum allowable SINR, which can be as low as −40 dB. If SINRt is not at the minimum, then SINRt is reduced by Nr steps in step 710, where Nr is a predefined integer value and is typically 1, and FE and FC are re-initialized in step 505. If SINRt is at the minimum, then the forward link transmitting beam width is compared to the minimum allowable beam width in step 715, where the minimum allowable beam width is usually determined by the maximum antenna gain that the antenna array can achieve and the spacing between the antenna elements of the array. If the beam width is at the minimum, FE and FC are re-initialized in step 505. However, if the beam width is not at the minimum, the beam width is reduced by Nr steps in step 720.

If the beam width had not been changed the last time, the beam width is compared to the minimum allowable beam width in step 725. If the beam width is not at the minimum, the beam width is reduced by Nr steps in step 730, and FE and FC are re-initialized in step 505. If the beam width is at the minimum, SINRt is compared to the minimum allowable SINR. If the SINRt is at the minimum, FE and FC are re-initialized in step 505. However, if the SINRt is not at the minimum, the SINRt is reduced by Nr steps, and FE and FC are re-initialized in step 505. This algorithm incorporates both forward link beam width control and power control so that overall base station transmitting power is minimized and forward link frame error rates are adequate.

VII. Uneven Step Sizes and Holding Interval for Beam Width Selection

The step size for widening the beam width is not necessarily the same as the step size for narrowing the beam width. For example, if there are two consecutive errors, the widening step can be twice (or more) than that of the narrowing step. A holding time for narrowing the beam width can be introduced when the beam width has just been widened. This holding time can be made to be a function of the widening step that has just been widened. For example, the larger the widening step, the smaller the holding time is needed.

Although the invention has been described with reference to particular embodiments, the description is only an example of the invention's application and should not be taken as a limitation. Consequently, various adaptations and combinations of features of the embodiments disclosed are within the scope of the invention as defined by the following claims.

We claim:

1. A method of operating a wireless communication system, comprising:

transmitting a pilot channel signal from a base station to a mobile station;

determining a direction for transmitting a traffic channel signal from the base station to the mobile station;

determining a beam width for the traffic channel signal based on a number of frame errors, wherein the traffic channel signal has a 3-dB beam width narrower than the beam width of the pilot channel signal;

transmitting the traffic channel signal from the base station and to the mobile station;

adjusting a target signal to interference-plus-noise ratio (SINRt) for the mobile station based on the number of frame errors, wherein when a threshold number of frame errors is met or exceeded:

increasing the beam width for the traffic channel signal if a first condition is met;

increasing the target SINRt if a second condition is met; or leaving the beam width for the traffic channel signal and the target SINRt unchanged if a third condition is met.

2. The method of claim 1, wherein:

the first condition is met when any one of the following is met:
if the beam width for the traffic channel signal was decreased last time;
if the beam width for the traffic channel signal was increased last time, but not to a maximum beam width, and the traffic SINRt is at a maximum allowable SINRt; or
if the beam width for the traffic channel signal was neither changed last time nor at the maximum beam width, and the target SINRt was increased last time;

the second condition is met when any of the following is met:
if the target SINRt was decreased last time;
if the target SINRt was increased last time, but not to the maximum allowable SINRt, and the beam width for the traffic channel signal is at the maximum beam width; or
if the target SINRt was neither changed last time nor at the maximum allowable SINRt, and the beam width for the traffic channel signal was increased last time; and the third condition is met when the beam width for the traffic channel signal is at the maximum beam width and the traffic SINRt is at the maximum allowable SINRt.

3. A method of operating a wireless communication system, comprising:
   transmitting a pilot channel signal from a base station to a mobile station;
   determining a direction for transmitting a traffic channel signal from the base station to the mobile station;
   determining a beam width for the traffic channel signal based on a number of frame errors, wherein the traffic channel signal has a 3-dB beam width narrower than the beam width of the pilot channel signal;
   transmitting the traffic channel signal from the base and station to the mobile station;
   adjusting a target signal to interference-plus-noise ratio (SINRt) for the mobile station based on the number of frame errors, wherein when a threshold number of frame errors is not met:
   decreasing the beam width for the traffic channel signal if a first condition is met;
   decreasing the target SINRt if a second condition is met; or
   leaving the beam width for the traffic channel signal and the target SINRt unchanged if a third condition is met.

4. The method of claim 3, wherein:
   the first condition is met when any one of the following is met:
      if the beam width for the traffic channel signal was changed last time, but not to a minimum beam width, and the target SINRt is at a minimum allowable SINRt; or
      if the beam width for the traffic channel signal was neither changed last time nor at the minimum beam width;
   the second condition is met when any of the following is met:
      if the beam width for the traffic channel signal was changed last time and the target SINRt is not at the minimum allowable SINRt; or
      if the beam width for the traffic channel signal was not changed last time, but is at the minimum beam width, and the target SINRt is not at the minimum allowable SINRt; and
   the third condition is met when the beam width for the traffic channel signal is at the minimum beam width and the traffic SINRt is at the minimum allowable SINRt.

5. A method of operating a wireless communication system, comprising:
   transmitting a pilot channel signal from a base station to a mobile station;
   determining a direction for transmitting a traffic channel signal from the base station to the mobile station;
   determining a beam width for the traffic channel signal based on a number of frame errors, wherein the traffic channel signal has a 3-dB beam width narrower than the beam width of the pilot channel signal;
   transmitting the traffic channel signal from the base station to the mobile station; and
   matching, approximately, the phase of the pilot channel signal to the phase of the traffic channel signal, wherein the matching comprises introducing a phase correction factor to traffic channel signal beam weights and, wherein the phase correction factor is dependent on the average of the phase difference between the pilot and traffic channel signals.

6. The method of claim 5, wherein the matching comprises:
   determining differences of the phase of the pilot channel signal and the phase of the traffic channel signal over dominant paths of the traffic channel signals;
   squaring the differences;
   summing the squared differences; and minimizing the summed squared differences.

7. The method of claim 5, further comprising maintaining an approximate constant effective radiated power for all antenna array beam patterns with a different antenna gains but directed in approximately the same direction.

8. The method of claim 7, wherein the maintaining comprises adjusting beam forming coefficients for the traffic channel signals.

9. The method of claim 5, wherein the beam width determination comprises selecting the narrowest beam width having a downlink frame error rate less than a downlink frame error rate threshold.

10. The method of claim 5, wherein the beam width for the traffic channel signal is a function of an estimated distance between the base station and the mobile station.

11. The method of claim 10, wherein the maximum beam width for the traffic signal decreases as the estimated distance increases.

12. The method of claim 5, wherein the direction is determined based on angle of arrival information for signals transmitted from the mobile station to the base station.

13. The method of claim 5, wherein the beam width determination comprises increasing the beam width if a threshold number of frame errors is met or exceeded.

14. The method of claim 13, wherein the beam width determination further comprises decreasing the beam width if the threshold number of frame errors is not met.

15. The method of claim 14, wherein the increasing and the decreasing are with different size steps.

16. The method of claim 14, wherein the increasing and the decreasing are with same size steps.

17. The method of claim 5, further comprising adjusting a target signal to interference-plus-noise ratio (SINRt) for the mobile station based on the number of frame errors.

18. The method of claim 17, wherein the adjusting comprises increasing the SINRt if a threshold number of frame errors is met or exceeded.

19. The method of claim 18, wherein the adjusting further comprises decreasing the SINRt if the threshold number of frame errors is not met.

20. The method of claim 5, wherein the beam width for the traffic channel signal is a function of an estimated angular spread as observed from the base station.

21. The method of claim 5, wherein the average is over dominant paths of the traffic channel signals.

22. A method of operating a wireless communication system, comprising:
   transmitting a pilot channel signal from a base station to a mobile station;
   determining a direction for transmitting a traffic channel signal from the base station to the mobile station;
   determining a beam width for the traffic channel signal based on a number of frame errors, wherein the traffic channel signal has a 3-dB beam width narrower than the beam width of the pilot channel signal; and
   transmitting the traffic channel signal from the base station to the mobile station, wherein the beam width for the traffic channel signal is a function of an estimated angular spread as observed from the base station and, wherein the maximum beam width for the traffic signal just exceeds the estimated angular spread when the estimated angular spread is available.

23. A method of operating a wireless communication system, comprising:
  transmitting a pilot channel signal from a base station to a mobile station;
  determining a direction for transmitting a traffic channel signal from the base station to the mobile station;
  determining a beam width for the traffic channel signal based on a number of frame errors, wherein the traffic channel signal has a 3-dB beam width narrower than the beam width of the pilot channel signal; and
  transmitting the traffic channel signal from the base station to the mobile station, wherein the beam width for the traffic channel signal is a function of an estimated angular spread as observed from the base station and, wherein the maximum beam width for the traffic signal is a sector-wide beam width when the estimated angular spread is not available.

24. A method of operating a wireless communication system, comprising:
  transmitting a traffic channel signal from a base station to a mobile station;
  adjusting the beam width of the traffic channel signal based on a number of frame errors; and
  adjusting a target signal to interference-plus-noise ratio (SINRt) for the mobile station based on the number of frame errors, wherein when a threshold number of frame errors is met or exceeded:
  increasing the beam width for the traffic channel signal if a first condition is met;
  increasing the target SINRt if a second condition is met; or
  leaving the beam width for the traffic channel signal and the target SINRt unchanged if third condition is met.

25. The method of claim 24, wherein:
  the first condition is met when any one of the following is met:
    if the beam width for the traffic channel signal was decreased last time;
    if the beam width for the traffic channel signal was increased last time, but not to a maximum beam width, and the traffic SINRt is at a maximum allowable SINRt; or
    if the beam width for the traffic channel signal was neither changed last time nor at the maximum beam width, and the target SINRt was increased last time;
  the second condition is met when any of the following is met:
    if the target SINRt was decreased last time;
    if the target SINRt was increased last time, but not to the maximum allowable SINRt, and the beam width for the traffic channel signal is at the maximum beam width; or
    if the target SINRt was neither changed last time nor at the maximum allowable SINRt, and the beam width for the traffic channel signal was increased last time; and
  the third condition is met when the beam width for the traffic channel signal is at the maximum beam width and the traffic SINRt is at the maximum allowable SINRt.

26. A method of operating a wireless communication system, comprising:
  transmitting a traffic channel signal from, a base station to a mobile station;
  adjusting the beam width of the traffic channel signal based on a number of frame errors; and
  adjusting a target signal to interference-plus-noise ratio (SINRt) for the mobile station based on the number of frame errors, wherein when a threshold number of frame errors is not met:
  decreasing the beam width for the traffic channel signal if a first condition is met;
  decreasing the target SINRt if a second condition is met; or
  leaving the beam width for the traffic channel signal and the target SINRt unchanged if third condition is met.

27. The method of claim 26, wherein:
  the first condition is met when any one of the following is met:
    if the beam width for the traffic channel signal was changed last time, but not to a minimum beam width, and the target SINRt is at a minimum allowable SINRt; or
    if the beam width for the traffic channel signal was neither changed last time nor at the minimum beam width;
  the second condition is met when any of the following is met:
    if the beam width for the traffic channel signal was changed last time and the target SINRt is not at the minimum allowable SINRt; or
    if the beam width for the traffic channel signal was not changed last time, but is at the minimum beam width, and the target SINRt is not at the minimum allowable SINRt; and
  the third condition is met when the beam width for the traffic channel signal is at the minimum beam width and the traffic SINRt is at the minimum allowable SINRt.

28. A method of transmitting signals wirelessly from a base station to a mobile station, comprising:
  determining a phase of a first signal; determining a phase of a second signal; minimizing the difference between the phase of the first signal and the phase of the second signal; and
  transmitting the first signal on a first channel having a first 3-dB beam width and transmitting the second signal on a second channel having a second 3-dB beam width wider than the first 3-dB beam width, wherein the first signal is a traffic signal and the second signal is a pilot signal, wherein the first 3-dB beam width is a function of an estimated angular spread as observed from the base station, and wherein the maximum first 3-dB beam width just exceeds the estimated angular spread when the estimated angular spread is available.

29. The method of claim 28, further comprising maintaining an approximately constant effective radiated power between the first antenna beam and the second antenna beam in the direction of the first beam, when both beams have the same power control values.

30. The method of claim 28, wherein the first 3-dB beam width is a function of an estimated distance between the base station and the mobile station.

31. The method of claim 30, wherein the maximum first 3-dB beam width decreases as the estimated distance increases.

32. The method of claim 28, wherein the second 3-dB beam width is sector wide.

33. The method of claim 32, further comprising minimizing the first 3-dB beam width based on the number of frame errors, wherein the minimized first 3-dB beam width is associated with a number of frame errors not exceeding a frame error threshold.

* * * * *